G. MELLING.
DIE SINKING OR ROUTING TOOL.
APPLICATION FILED SEPT. 8, 1911.

1,029,208.

Patented June 11, 1912.

Witnesses
Harold O. Van Antwerp.
Anna De Windt

Inventor
George Melling.
By Luther V. Moulton
Attorney

UNITED STATES PATENT OFFICE.

GEORGE MELLING, OF JACKSON, MICHIGAN, ASSIGNOR OF ONE-THIRD TO HERMAN W. MELLING AND ONE-THIRD TO LE ROY NORTHRUP, BOTH OF JACKSON, MICHIGAN.

DIE-SINKING OR ROUTING TOOL.

1,029,208.  Specification of Letters Patent.  Patented June 11, 1912.

Application filed September 8, 1911. Serial No. 648,318.

*To all whom it may concern:*

Be it known that I, GEORGE MELLING, a citizen of the United States of America, residing at Jackson, in the county of Jackson and State of Michigan, have invented certain new and useful Improvements in Die-Sinking or Routing Tools; and I do hereby declare the following to be a full, clear, and exact description of the invention, such as will enable others skilled in the art to which it appertains to make and use the same.

My invention relates to improvements in die sinking or routing tools adapted to be operated by a machine having a universally movable bed to hold the work and a vertical spindle to drive the cutting tool, and its object is to provide an improved tool for the purpose of use in such a machine, and to provide the same with various new and useful features.

My invention consists essentially of a suitable frame for attachment to the machine, gears rigidly connected and each carrying a cutter, driving gears engaging the first named gears and recessed to permit the cutters to pass therethrough and suitable connecting gears between the last named gears and the machine spindle, and in various features of construction and arrangement as will more fully appear by reference to the accompanying drawings, in which:—

Figure 1:
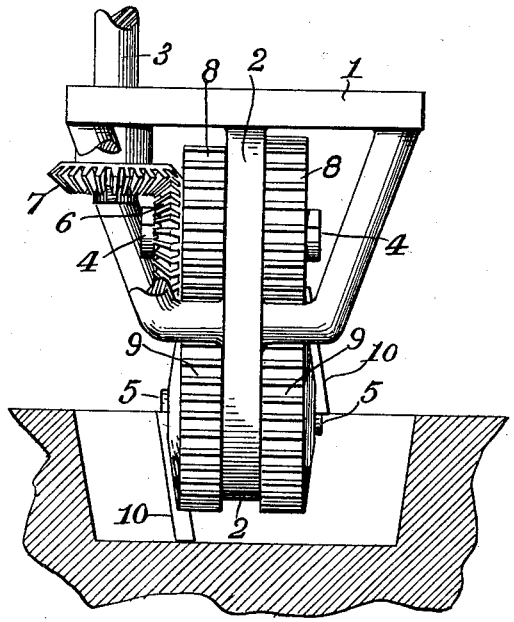
Figure 2:
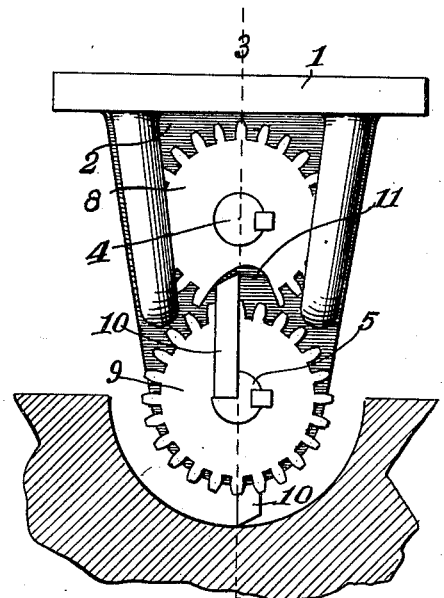
Figure 3:
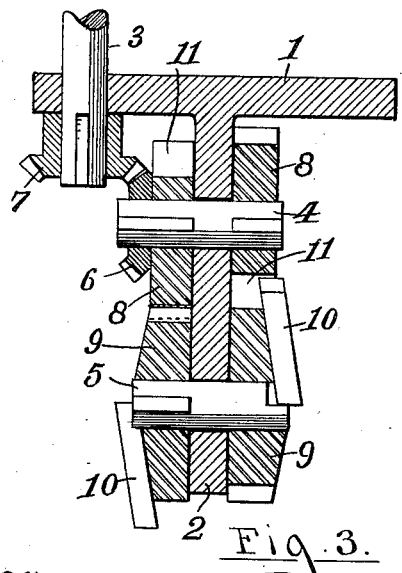
Figure 4:
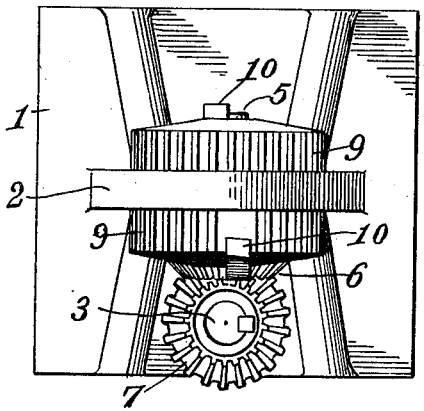

Figure 1 is a front elevation of a device embodying my invention; Fig. 2 a side elevation of the same; Fig. 3 a vertical section of the same on the line 3—3 of Fig. 2; and Fig. 4 an inverted plan view of the same.

Like numbers refer to like parts in all of the figures.

1 represents any suitable frame to be rigidly attached to any suitable machine and provided with a downwardly extended vertical web or middle member 2 in which are journaled two shafts 4 and 5. This middle member has preferably parallel plane surfaces engaged by opposing pairs of gears 8 and 9 rigidly fixed on the respective shafts, the lower shaft carrying the gears 9 and the upper shaft carrying the gears 8. The inner opposing sides of these gears run in contact with the opposite plane surfaces of the web to assist in maintaining the gears in parallel relation. The outer sides of the gears 9 are preferably slightly conical giving an inward inclination to the outer ends of oppositely projecting cutters 10 arranged radially in the respective gears 9 the outer ends of the shaft 10 being recessed to receive the inner ends of the cutters. These cutters each project beyond the periphery of the gear in which it is inserted and are provided with suitable cutting angles on the ends and on the outer sides. The gears 9 are engaged by the driving gears 8 fixed on the shaft 4 and each having a recess 11 in its periphery to permit the cutter in the gear driven thereby to pass, these cutters and recesses being oppositely arranged. When one cutter is passing through a recess in one of the gears 8 the other gear 8 operates to drive the gears 9 thus providing for continuous driving of the latter together with the cutters attached thereto. The upper shaft 4 is prolonged at one end outside of the gear 8 and fixed thereon is a miter gear 6 engaged by a corresponding miter gear 7 mounted on the lower end of a vertical shaft 3 which latter is driven by any suitable means (not shown). Obviously the upper shaft may be driven by any other suitable gearing as occasion may arise.

In operation, as the cutters rotate about the axis of the shaft 5 the ends of the same will cut a concave channel in the work and the radial edge of each cutter will operate to enlarge the channel in the direction of the axis of rotation, the work being held and moved to the cutter in the usual way, (not shown).

What I claim is:—

1. A die sinking or routing tool, comprising two gears fixed on a shaft, cutters inserted in the outer sides of said gears and projecting radially beyond the same, driving gears engaging said gears fixed on a second shaft and having respective recesses for the passage of the cutters and means for driving the second named gears.

2. A die sinking or routing tool, comprising a frame having a web or middle member, two shafts journaled in the same, a pair of gears fixed on each shaft and engaging the opposing gears on the other shaft, cutters inserted in the outer sides of one pair of gears and projecting radially beyond the same, recesses in the other gears to permit the passage of the cutters, the cutters and recesses being oppositely arranged in each respective pair of gears and means for driving the recessed gears.

3. A die sinking or routing tool, comprising a frame having a depending web, two shafts journaled in the web, a pair of gears fixed on one shaft having conical outer surfaces, radially disposed cutters in said conical surfaces and projecting beyond the periphery of the same, driving gears fixed on the other shaft engaging the first named gears and each having a recess to permit a cutter to pass and means for driving said last named shaft.

4. A die sinking or routing tool, comprising a frame having a depending web with flat parallel sides, an upper shaft and a lower shaft journaled in the web, a pair of gears fixed on each shaft and engaging opposite sides of the web oppositely arranged radial cutters inserted in the outer sides of the lower gears and projecting beyond the peripheries of the same, the gears on the upper shaft having oppositely arranged recesses therein to permit the passage of the cutters and bevel gearing adapted to connect the upper shaft with a vertical driving spindle.

In testimony whereof I affix my signature in presence of two witnesses.

GEORGE MELLING.

Witnesses:
WILLARD H. REED,
R. P. BRYAN.

Copies of this patent may be obtained for five cents each, by addressing the "Commissioner of Patents, Washington, D. C."